(12) United States Patent
Mir et al.

(10) Patent No.: US 8,510,227 B2
(45) Date of Patent: *Aug. 13, 2013

(54) SYSTEMS AND METHODS FOR ELECTRONICALLY MANAGING CONTENT

(75) Inventors: Ari Mir, Los Angeles, CA (US); Ophir Tanz, Beverly Hills, CA (US)

(73) Assignee: GumGum, Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/458,606

(22) Filed: Apr. 27, 2012

(65) Prior Publication Data
US 2012/0303449 A1   Nov. 29, 2012

Related U.S. Application Data

(63) Continuation of application No. 13/225,208, filed on Sep. 2, 2011, now Pat. No. 8,170,956, which is a continuation of application No. 12/431,630, filed on Apr. 28, 2009, now Pat. No. 8,036,990.

(51) Int. Cl.
    *G06F 21/00* (2006.01)
(52) U.S. Cl.
    USPC ............. 705/59; 705/50; 705/51; 705/901; 705/902; 726/1
(58) Field of Classification Search
    USPC .......................................................... 705/59
    See application file for complete search history.

(56) References Cited

U.S. PATENT DOCUMENTS

| | | | |
|---|---|---|---|
| 7,257,585 B2 | 8/2007 | Stevenson et al. | |
| 7,853,558 B2 | 12/2010 | Brindley | |
| 8,112,310 B1 | 2/2012 | Yehoshua et al. | |
| 8,122,014 B2 | 2/2012 | Brindley et al. | |
| 2002/0128959 A1 | 9/2002 | Kostic et al. | |
| 2003/0195837 A1 | 10/2003 | Kostic et al. | |
| 2004/0103024 A1 | 5/2004 | Patel et al. | |
| 2004/0260767 A1 | 12/2004 | Kedem et al. | |
| 2005/0097204 A1 | 5/2005 | Horowitz et al. | |
| 2005/0154746 A1* | 7/2005 | Liu et al. | 707/101 |
| 2005/0187818 A1 | 8/2005 | Zito et al. | |
| 2006/0168664 A1* | 7/2006 | Frank et al. | 726/27 |
| 2006/0265493 A1 | 11/2006 | Brindley et al. | |
| 2007/0033105 A1 | 2/2007 | Collins et al. | |
| 2008/0109844 A1 | 5/2008 | Baldeschwieler et al. | |
| 2008/0249855 A1 | 10/2008 | Collins et al. | |
| 2008/0262917 A1 | 10/2008 | Green et al. | |

(Continued)

FOREIGN PATENT DOCUMENTS

JP          2009009500 A    *   1/2009

OTHER PUBLICATIONS

Rosenblatt et al. Integrating Content Management with Digital Rights Management (May 14, 2003). 21 pages. retrieved online Apr. 4, 2011.*

U.S. Appl. No. 61/156,626, Tung et al.

(Continued)

*Primary Examiner* — James A Reagan
(74) *Attorney, Agent, or Firm* — Knobbe, Martens, Olson & Bear LLP

(57) ABSTRACT

Systems and methods are provided for electronically managing content. In one embodiment, information identifying content items found on a page is received from a client system through code embedded on the page. Systems and methods for associating advertisement data with content items are also disclosed.

25 Claims, 7 Drawing Sheets

(56) References Cited

U.S. PATENT DOCUMENTS

| | | |
|---|---|---|
| 2009/0006375 A1 | 1/2009 | Lax et al. |
| 2009/0063229 A1 | 3/2009 | Coladonato et al. |
| 2009/0089151 A1 | 4/2009 | Protheroe et al. |
| 2009/0106087 A1 | 4/2009 | Konar |
| 2009/0132363 A1 | 5/2009 | Powell et al. |
| 2009/0259517 A1 | 10/2009 | Wise |
| 2009/0259530 A1 | 10/2009 | Wise |
| 2011/0015996 A1 | 1/2011 | Kassoway et al. |
| 2011/0071911 A1 | 3/2011 | Tung et al. |
| 2011/0258529 A1 | 10/2011 | Doig et al. |
| 2011/0320429 A1 | 12/2011 | Doig et al. |
| 2011/0321003 A1 | 12/2011 | Doig et al. |
| 2012/0054440 A1 | 3/2012 | Doig et al. |
| 2012/0095834 A1 | 4/2012 | Doig et al. |

OTHER PUBLICATIONS

Picad Media—TechCrunch50 Conference 2008, information regarding Sep. 8, 2008 demo, available at http://www.techcrunch50.com/2008/demopit_company.php?demopit=21.

"Picad Media Launches the World's First Online In-Picture Ad Network at TechCrunch 50," press release dated Sep. 8, 2008, available at http://www.techcrunch50.com/2008/press_releases/8738dd875a604ac0be65035f64e5264c.pdf.

Arrington, Michael, "GumGum Launches New Image Licensing Platform", dated Feb. 13, 2008, available at http://techcrunch.com/2008/02/13/gumgum-launches-new-image-licensing-platform/.

Kincaid, Jason, "GumGum Rethinks Its Approach. Drops Flash", dated Jul. 31, 2008, available at http://techcrunch.com/2008/07/31/gumgum-launches-image-licensing-platform-that-doesnt-use-flash/.

* cited by examiner

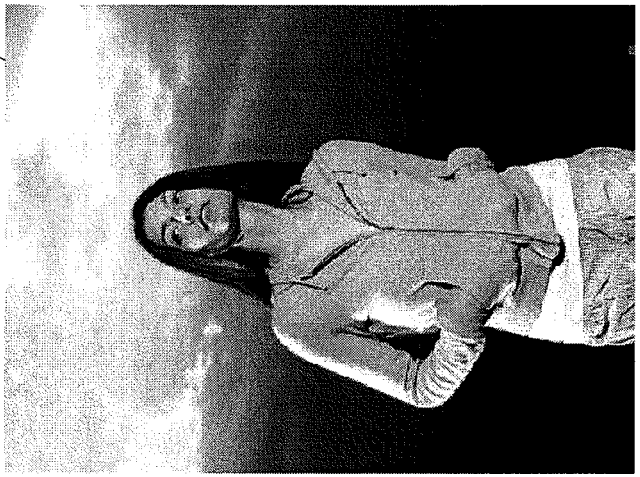
FIG. 4D
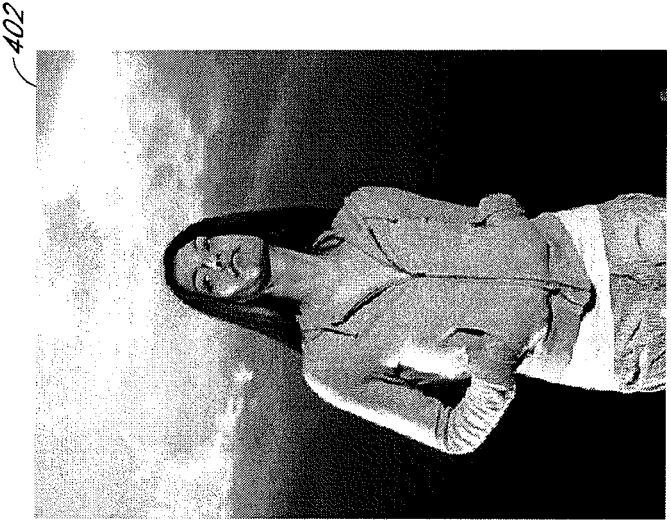
FIG. 4C

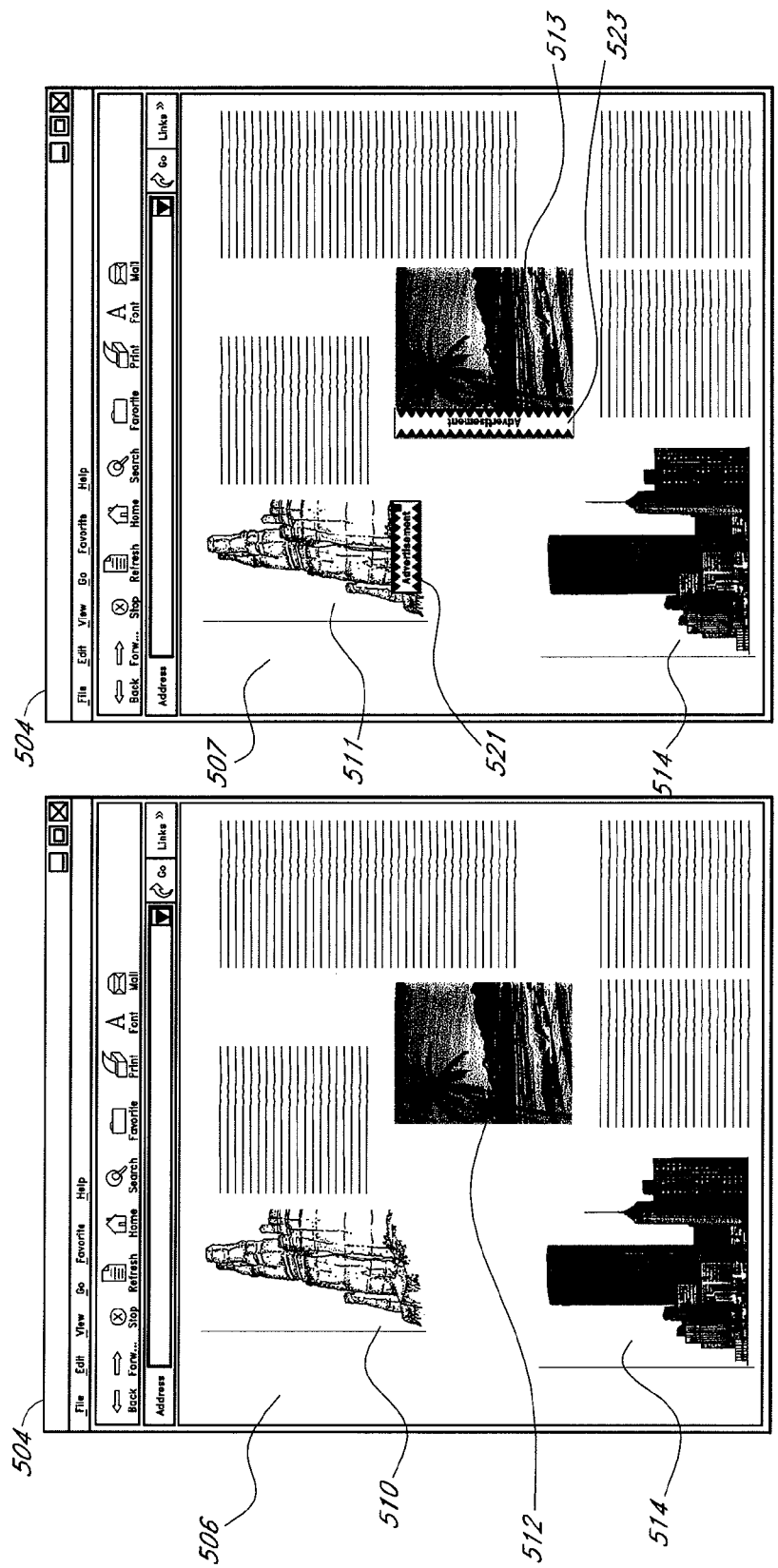

SYSTEMS AND METHODS FOR ELECTRONICALLY MANAGING CONTENT

PRIORITY INFORMATION

This application is a continuation of and claims benefit of priority under 35 U.S.C. §120 to U.S. patent application Ser. No. 13/225,208, entitled "Systems and Methods for Electronically Managing Content," filed Sep. 2, 2011, which is a continuation of U.S. patent application Ser. No. 12/431,630, filed Apr. 28, 2009, now issued as U.S. Pat. No. 8,036,990, both of which are hereby incorporated by reference in their entirety herein.

BACKGROUND

1. Field of the Invention

Embodiments of the disclosure generally relate to the field of content licensing, and in particular, to systems and methods for electronically managing content licenses.

2. Description of the Related Art

Publishers of various types of content often include or incorporate content created by others in their publications. For example, a news article may include a photo created by a third party. The owner of the rights to that photo and the publisher of the article incorporating the photo may wish to enter into a licensing arrangement whereby the content owner is compensated for the publisher's use of the licensed content. A given publisher may license content from a large number of content owners.

SUMMARY OF THE DISCLOSURE

Accordingly, there is a need for systems and methods that can effectively manage content licenses electronically. In some embodiments, client and content identification information and page metadata is received from a client system, and a database comprising content licensing data is searched to determine if the content is licensed and to determine a payment method for the license. In some embodiments, a database comprising advertisement information is searched to determine an advertisement to associate with each piece of licensed content on a webpage, and advertisement data is sent to the client system.

In one embodiment, a computer system is disclosed. The system may include computer-readable storage comprising a license database storing a plurality of records, the plurality of records comprising content licensing data, a processor configured to access the plurality of records in the computer-readable storage, an input module configured to receive from a client system a client identifier, at least one content identifier, and metadata about a webpage, the content identifier indicating content found on the webpage, and a licensing module configured to search the license database to determine if the content is licensed and to determine the payment method for the license.

In another embodiment, a computer implemented method of electronically managing content licenses is disclosed. The computer implemented method may include receiving from a client system a client identifier, at least one content identifier, and metadata about a webpage, the content identifier indicating content found on the webpage, searching a license database to determine if the content is licensed, searching an advertiser database comprising information on a plurality of advertisements and determining which advertisement, if any, to associate with each piece of licensed content on the webpage, and sending advertisement data to the client system.

For purposes of this summary, certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

BRIEF DESCRIPTION OF THE DRAWINGS

The foregoing and other features, aspects and advantages of the present invention are described in detail below with reference to the drawings of various embodiments, which are intended to illustrate and not to limit the invention. The drawings comprise the following figures.

FIGS. 4A-4D are representations of various layouts of an advertisement and an associated piece of licensed content.

FIGS. 5A-4B are representations of the layout of a webpage before and after associating advertisements with licensed content items.

DESCRIPTION OF THE EMBODIMENTS

Figure 1:
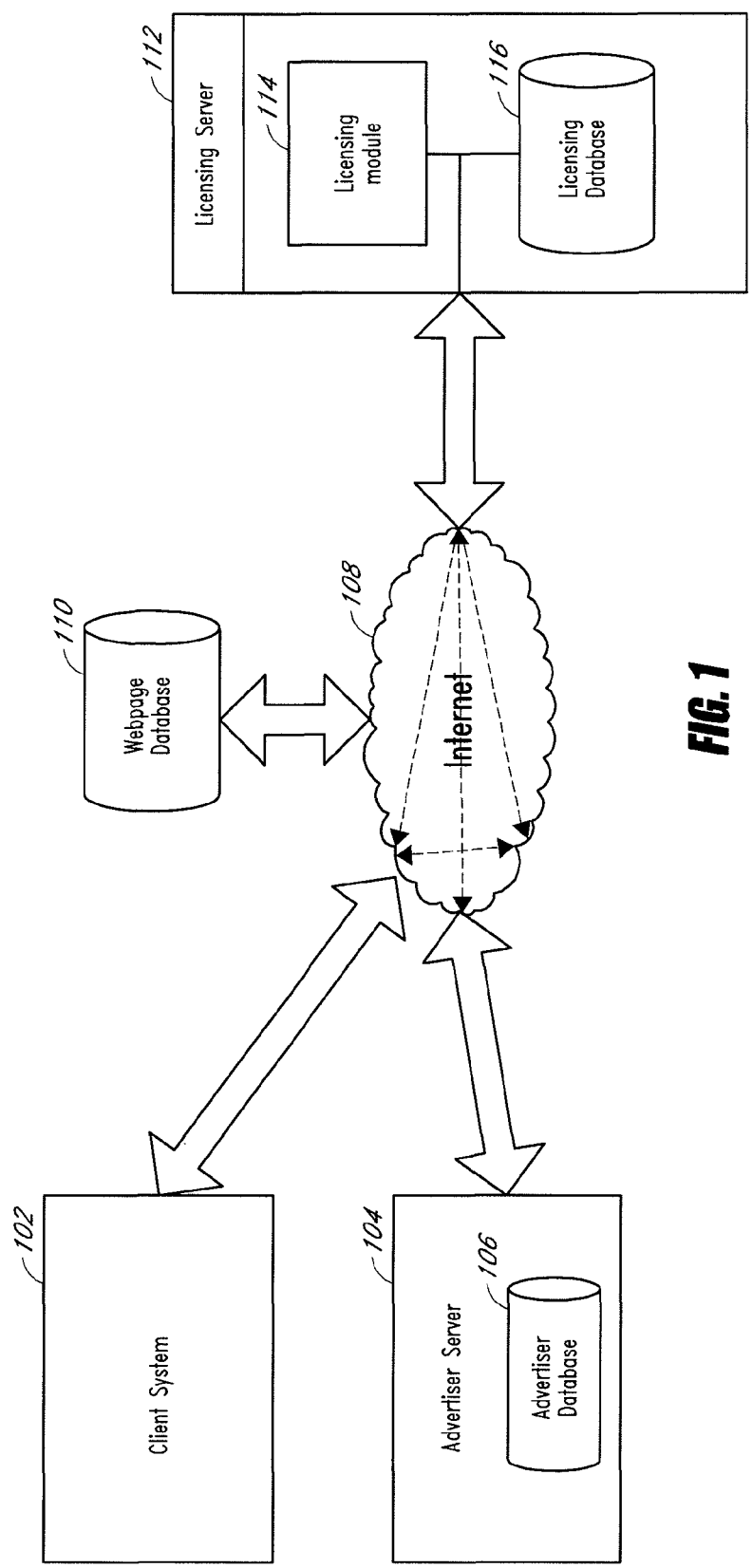
FIG. 1 is a high-level block diagram of one embodiment of a licensing system including a licensing server in communication with a client system and an advertiser server.

Although several embodiments, examples and illustrations are disclosed below, it will be understood by those of ordinary skill in the art that the invention described herein extends beyond the specifically disclosed embodiments, examples and illustrations and includes other uses of the invention and obvious modifications and equivalents thereof. Embodiments of the invention are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the invention. In addition, embodiments of the invention can comprise several novel features and no single feature is solely responsible for its desirable attributes or is essential to practicing the inventions herein described.

I. High-Level Overview

The content licensing system as contemplated by one embodiment of the disclosure herein generally comprises a licensing server electronically connected to one or more client systems and one or more advertiser servers through a communications network or networks. The communications network may include one or more of a local area network ("LAN"), a wide area network ("WAN"), an intranet, a wired network, a wireless network, the Internet or the like. In one embodiment, the licensing server comprises a Web server connected to the World Wide Web. Client systems are then able to connect to the licensing server through their respective systems comprising any network-enabled and connected device, such as, for example, a personal computer ("PC").

An example that considers the use of one embodiment of the licensing system with a hypothetical client system and publisher may be illustrative. Suppose for purposes of this example that the communications network is the Internet. Chris, an Internet user, sits down at his web-enabled PC, opens an Internet browser program, such as for example, Internet Explorer, and accesses a publisher server, hosted on a web-server accessible via a network such as the World Wide Web. Suppose for purposes of this example that the publisher is The News, a fictional publisher of news articles. Chris accesses a webpage on the publisher server comprising, for example, HTML code. The webpage may include both text of a news article written by The News and various photos that The News has obtained permission to use through licenses with the content owners. The terms of the license associated with each photo may be stored in a licensing database accessible through the licensing server. The News may include a small portion of code on each of its webpages, for example a line of JavaScript, that instructs any client system accessing the webpage to request additional code from the licensing server.

When Chris's Internet browser program processes the webpage, it executes the embedded code and requests additional code from the licensing server. The licensing server then sends additional code to Chris's system that determines whether the page content includes potentially licensed content. Suppose that the webpage includes two licensed photos and one unlicensed photo. The additional code will determine that the page includes potential licenses and will instruct Chris's system to send data identifying The News and the content on the page, as well as other page metadata, to the licensing server. The licensing server then searches the license database, as further discussed below, and determines the payment method for any licensed content on the page. Suppose for purposes of this example that the payment method for each of the two licensed photos on this webpage is inclusion of an advertisement. In this case, the licensing server would determine an advertisement to associate with each licensed photo, as further discussed below, and send this information to Chris's system. The additional code from the licensing server would then instruct Chris's Internet browser program to display the associated advertisements, for example by overlaying an advertisement over a portion of each licensed photo on the webpage. Many other forms of advertisements and their display are also possible, as will be discussed below. The licensing system records Chris's views of the photos on the webpage and information regarding the corresponding advertisements sent to Chris's system for display.

In this example, the resulting webpage displayed to Chris would comprise the text of the article and the accompanying three photos, with advertisements over a portion of the two licensed photos. The advertisements may also include links to the advertiser's server that Chris may select, for example by clicking on a hypertext link, in order for Chris to learn more about the subject of the advertisement. If Chris did select such a link, the advertisement selection information would be sent to the licensing server to be recorded. Depending on the terms of the licenses, the licensing server may then determine, for each piece of licensed content, what percentage of the money paid by the advertiser for both views of its advertisements and clicks on its advertisements belongs to each The News and the content owner with rights to the photo.

FIG. 1 illustrates one embodiment of a content license management system in which a licensing server 112 communicates with a client system 102 and one or more advertiser servers 104 via a communications network or networks, such as the Internet 108. In one embodiment of the content license management system, the licensing server 112, client system 102, and/or the advertiser server 104 may also be in communication with a webpage database 110. This may be through a similar or different communications network as that labeled 108 in FIG. 1. In the embodiment shown in FIG. 1, the licensing server 112 comprises a licensing module 114 and licensing database 116. In the embodiment shown, the advertiser server 104 comprises an advertiser database 106. In other embodiments, the advertiser database 106 may be located on the licensing server 112. In some embodiments, a separate advertiser server 104 is not required, and the licensing server 112 may be responsible for advertisement selection.

II. Flowcharts a. Managing Content Licenses

Figure 2:
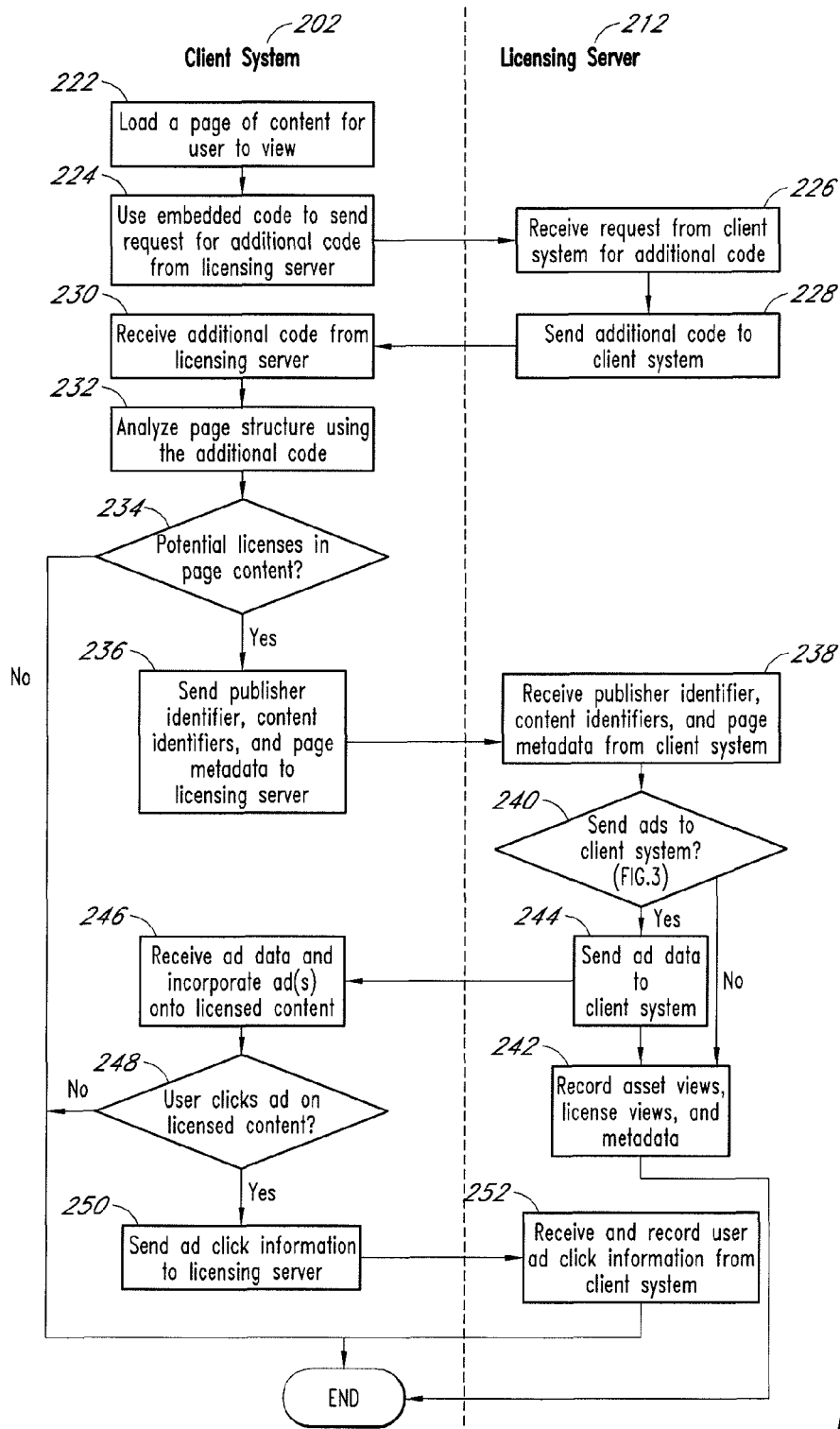
FIG. 2 is a flow chart illustrating one embodiment of a process for electronically managing content licenses.

FIG. 2 is a system flowchart showing the operation of some embodiments of the disclosure. The operation begins at block 222, where the client system 202 loads a page of content for the user to view. The page of content may be loaded from a webpage database accessible through a network, such as webpage database 110, or may be accessed locally from a database on the client system. The page of content may comprise one or more photos, images, videos, text, Flash objects, and various types of code. One of skill in the art will appreciate the wide range of possible content types that may comprise a page.

At block 224, the client system 202 uses code embedded in the page to send a request for additional code from the licensing server 212. In some embodiments, the embedded code is a small piece of code, such as one or two lines of JavaScript, which initiates contact between the client system 202 and licensing server 212, such that the licensing server 212 may further interact with the client system 202 as detailed below. In some embodiments, a publisher adds similar embedded code to any page in which the publisher may use licensed content. In some embodiments, it is desirable for the embedded code to not require modification if changes are made to either the content license management system or the page of content. Such code is desirable because a publisher is more likely to utilize the content license management system if changes to the system do not require changes on the publisher's part. Additionally, the content license system is better able to manage licenses if any adjustments made to the system do not require changes outside of the licensing server.

Next, at block 226, the licensing server 212 receives the request from the client system 202 for additional code. At block 228, the licensing server 212 sends additional code to the client system 228. In some embodiments, the additional code instructs the client system to analyze the page structure and check for potential licenses, as further discussed below. At block 230, the client system 202 receives the additional code from the licensing server 212. Then, at block 232, the client system executes the additional code to analyze the page structure. In some embodiments, analyzing the page structure comprises searching the page for content of a type that may be licensed, and for each such piece of content, analyzing the content and/or its associated metadata. For example, if the code recognizes that a given piece of content is a photo, the code may analyze the dimensions of the photo, the file name, the file location or path, such as the file's Uniform Resource Locator ("URL"), and other metadata. At block 234, the client system 202 uses the additional code to determine whether any of the page content is potentially licensed. In some embodiments, this step does not determine whether content is in fact licensed, but instead determines whether the analyzed content and associated metadata suggests that the content may be licensed. For example, in some embodiments the code may use a rule set to determine that certain content is unlikely to be licensed content. For instance, if the code determines that a given image is smaller than certain predetermined image dimensions, the code may consider that the image is not potentially licensed content. As another example, the code may analyze the filename or URL for various naming conventions or URL patterns known to be used in association with licensed content. In the embodiment shown in FIG. 2, if the client system determines at block 234 that there are no potential licenses in the page content, the process ends.

In some embodiments, if the client system 202 determines at block 234 that there are potential licenses in the page content, the client system sends information, such as for example, a publisher identifier, content identifiers, and page metadata, to the licensing server 212 at block 236. For example, in some embodiments, if the client system determines that an image is potentially licensed, the client system sends to the licensing server 212 information identifying the publisher of the page, the location or URL of the page, the dimensions of the image, and the location or URL of the image file. The information sent to the licensing server may comprise other metadata associated with the page and/or potentially licensed content, and may be dependent on the type of content. The licensing server 212 then receives the publisher identifier, content identifiers, and page metadata from the client system 202 at block 238.

At block 240, the licensing server 212 determines whether to send advertisement information to the client system 202. In some embodiments, the licensing server makes this determination based on the process shown in FIG. 3. If the licensing server determines at block 240 that advertisement data should not be sent to the client system, the process moves on to recording data at block 242, discussed below. If the licensing server instead determines at block 240 that advertisement data should be sent to the client system, the licensing server sends the advertisement data to the client system 202 at block 244. This advertisement data may take many forms, as discussed below in reference to FIG. 3. After sending advertisement data, the licensing server proceeds to block 242.

At block 242, the licensing server records asset views, license views, and metadata. In some embodiments, recording asset views comprises recording data related to each piece of content on the page, including content that is not licensed. In other embodiments, information regarding unlicensed content may only be recorded if certain rule sets are satisfied, such as a known URL pattern is recognized. One purpose for recording views of content that is not licensed is that content owners who do not license their content through the content licensing management system disclosed herein may be granted access to this information in order to learn of potentially unauthorized use of their content. In some embodiments, the licensing server records information regarding any advertisements that were sent to the client system, as well as which advertisements were associated with which content items. One of skill in the art will appreciate the wide range of possible methods for recording the asset views, license views, and associated data. In some embodiments, the data is stored in a database on the licensing server, as further defined in section IV below.

On the client system side, if advertisement data was sent from the licensing server at block 244, the client system 202 receives this information at block 246 and incorporates the received advertisements onto, adjacent to, or near the associated licensed content, or otherwise visually associated with the licensed content. The example embodiments of this advertisement incorporation are described in more detail below in reference to FIGS. 4A-4D and 5A-5B. In some embodiments, the client system may send data to the licensing server once the advertisement has actually been displayed, and the licensing server may then record that the advertisement was viewed. In some embodiments, the advertisements may be selected by the user of the client system, for example by the user placing a cursor over a portion of the advertisement and clicking a mouse button, or by the user touching a portion of the advertisement on a touch-screen. The user may select an advertisement, for example, if the user wishes to learn more about the advertisement or visit a webpage associated with the advertisement. If the user selects an advertisement at any point, the client system recognizes the selection at block 248. In some embodiments, the client system may recognize this selection by executing additional code received by the client system from the licensing server when advertisement data was received at block 246.

If the client system determines at block 248 that the user selected an advertisement, the client system sends this advertisement click information to the licensing server 212 at block 250. In some embodiments, the advertisement click information may instead be sent to an advertiser server, and the licensing server may then receive the click information from the advertiser server. At block 252, the licensing server receives and records the user advertisement click information from the client system. In some embodiments, the data recorded comprises information identifying: the advertisement, the associated licensed content item, the publisher, and the page. In some embodiments, the process is then complete for that content item, but the additional code would continue to recognize additional user clicks at block 248, such as selection of advertisements associated with other licensed content. In some embodiments, the process does not terminate on the client system side until the page is no longer active on the client system, such as when the user leaves the page by navigating his Internet browser to another page or by exiting the browser program.

It is recognized that FIG. 2 illustrates one embodiment of a process for electronically managing content licenses, and that other embodiments of the content licensing management process may be used.

b. Sending Advertisement Data

Figure 3:
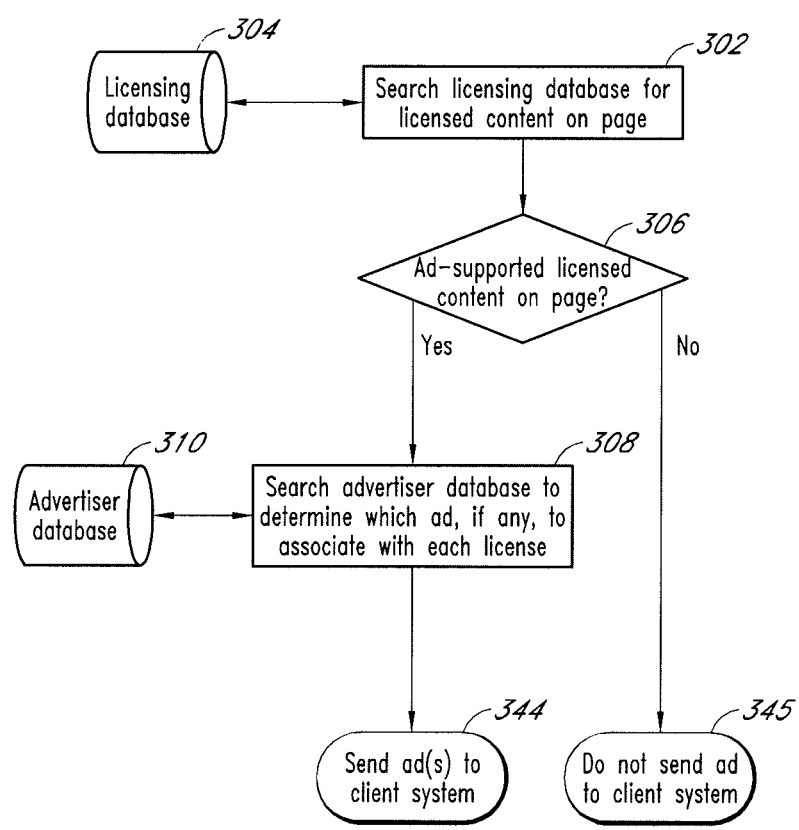
FIG. 3 is a flow chart illustrating one embodiment of a process for determining which advertisements, if any, to send to a client system.

FIG. 3 illustrates one embodiment of the process undertaken by the licensing server in block 240 of FIG. 2, namely the decisional step of whether to send advertisement data to the client system. The process begins at block 302, where the licensing server searches the licensing database 304 for licensed content on the page. In some embodiments, the licensing database 304 comprises information about a plurality of licensed content items and the licensing terms associated with that content. The licensing terms may comprise an indication of a payment method for the license. In some embodiments, one possible payment method is inclusion of an advertisement whenever a user views the licensed content on a publisher's page. Another possible payment method is monetary compensation on a pay per view basis, wherein the publisher pays the content owner whenever a user views the licensed content on the publisher's page, or at set milestones such as every hundred, thousand, or million views. In some embodiments, hybrid or combination payment methods are also possible, such as monetary compensation in addition to inclusion of an advertisement. In some embodiments, the licensing terms may also comprise information regarding how advertising revenue is shared between different entities, such as between the publisher, the content owner, and/or the operator of the content licensing management system.

At decisional block 306, the licensing server determines whether there is advertisement-supported content on the page. In some embodiments, the licensing server bases this decision at least in part on information in the licensing database 304, such as through locating a record in the database that corresponds to the given content item or content owner and determining whether the payment method associated with that license requires or permits inclusion of an advertisement. In some embodiments, the content owner may be determined based on an index in the licensing database, a rule set, or a combination of an index and rule set. A rule set may comprise, for example, naming conventions or URL patterns known to be used by certain content owners to identify their content. For example, a rule may state that a file is likely to contain content owned by a certain content owner if the filename contains a certain character string followed by a certain number of digits, or if the URL or file path of the file comprises one or more directories that follow known conventions of that content owner. In some embodiments, the content owner or license terms may be identified based on metadata stored with the content item, or based on page metadata where the file is referenced. In some embodiments, this decisional step may additionally analyze the contents of the file, such as checking for digital watermarks or other identifying information. In some embodiments, the file metadata or file contents analyzed by the licensing server may depend on the type of licensed content. For example, in some embodiments, if the content is an image the licensing server may perform image analysis to determine if the image matches an image known to be licensed.

If the licensing server determines at decisional block 306 that there is no advertisement-supported licensed content on the page, the process ends without sending any advertisement data to the client system. Alternatively, if there is advertisement-supported licensed content on the page, the licensing server at block 308 searches the advertiser database 310 to determine which advertisement, if any, to associate with each license. In some embodiments, the advertiser database comprises information on a plurality of advertisements. The information may comprise, for example, identification information for an advertiser, monetary amount to be paid per view and per user click-through, and a URL for a file containing the advertisement content. The advertisement may be in many forms, such as, for example, as described below in reference to FIGS. 4A-4D and 5A-5B. In some embodiments, the advertiser database 310 is located on the same server as the licensing database 116. In other embodiments, the advertiser database 310 is located on a third party server. In other embodiments, the licensing server 112 does not search an advertiser database, but instead leaves advertisement selection to another entity, such as Google AdSense. If an advertisement is selected, the advertisement data is then sent to the client system at block 344.

It is recognized that FIG. 3 illustrates one embodiment of a process for determining whether to send advertisement data to the client system and that other embodiments of the advertisement determination process may be used.

III. Example Content Layout a. Layout of Content and Advertisement

Figure 4A:
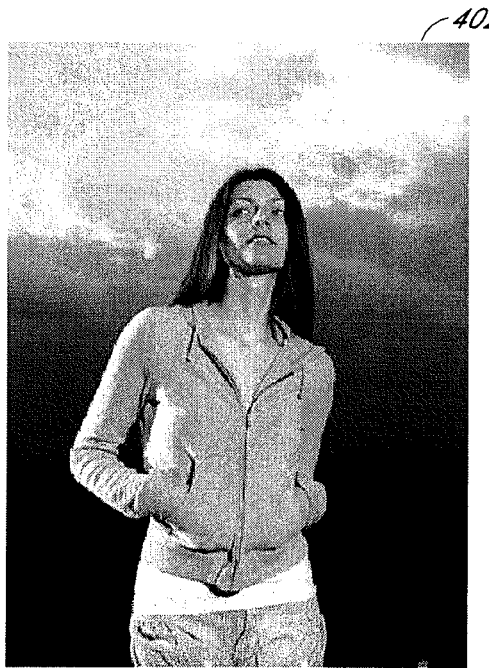

FIGS. 4A-4D illustrate embodiments of various layouts of an advertisement and an associated piece of licensed content. FIG. 4A is an example of a content item 402 that may be encountered on a page. In this example, the content item is a photo. Potentially licensed content items may be of many types, for example a content item may be an image, a video, a text, an animation, a section of executable code, a Flash object, or a collection or combination of content elements.

Figure 4B:
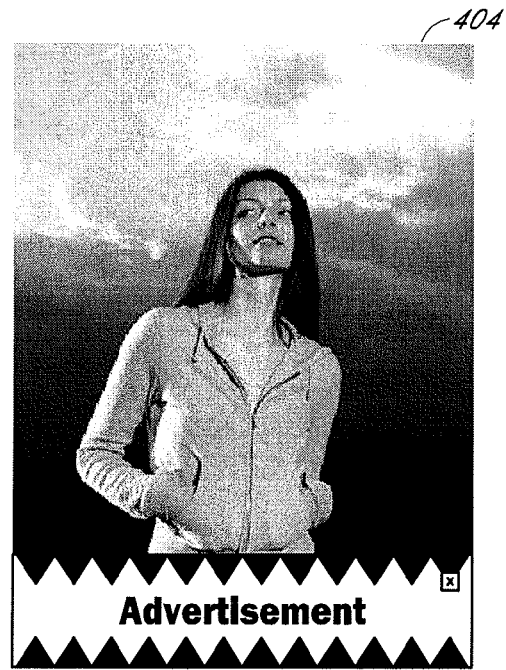

FIG. 4B illustrates one example of a licensed content item 404 with an associated advertisement 406, according to one embodiment. In this example, the licensing server has determined, through a system or method such as that detailed above in reference to FIGS. 2 and 3, that content item 404 is licensed and that the terms of that license require or permit inclusion of an advertisement. The advertisement 406 has been selected by the licensing server and received by the client system through a system or method as disclosed in reference to FIGS. 2 and 3. FIG. 4B is a representation of one possible result of the client system incorporating the advertisement 406 onto the licensed content 404, such as at block 246 of FIG. 2. An advertisement may comprise various types of content and may be of many forms. For example, an advertisement may be an image, an animation, text, HTML text, an interactive game or program, a video, a movie preview, an invitation, or a combination or collection of content elements. The advertisement 406 may by overlaid on the image 404 as shown in FIG. 4B. The advertisement may be of various shapes and sizes, and may move based on user actions or in a preprogrammed manner. In some embodiments, the advertisement 406 may be closed or minimized by the user, or may be moved or dragged by the user to a different location on the page, such as off of the content item 404. The advertisement may comprise code, or the page may comprise code, that allows the user to select the advertisement or a portion of the advertisement in order to learn more information related to the advertisement or to visit a page associated with the advertisement.

FIGS. 4C and 4D are representations of two alternative arrangements of a content item 402 and associated advertisements 408 and 410 in some embodiments. As seen in these figures, in some embodiments the advertisement may be placed adjacent to the content item on the page such that the content item's appearance is unaffected by the incorporated advertisement. An advertisement may be placed in many locations not shown in FIGS. 4A-4D, such as above the content item 402.

b. Layout in a Webpage

FIG. 5A is a representation of a layout of a webpage before any licensed content items have been identified by the content licensing management system. The page 506 is displayed in the browser window 504. The page in FIG. 5A comprises lines of text (represented in the figure as lines) and images 510, 512 and 514. As previously disclosed, a page may contain many other types of content, both licensed and unlicensed.

FIG. 5B is a representation of the webpage represented in FIG. 5A after advertisements have been incorporated with the licensed content according to the systems and methods disclosed herein. In this example, the licensing server has determined that content items 511 and 513 are licensed and that the license terms either require or permit advertisement incorporation. Accordingly, advertisements 521 and 523 have been incorporated with content items 511 and 513 respectively. In this example, advertisement 521 has been incorporated on top of or within content item 511. Advertisement 523 has been incorporated adjacent to content item 513 on a previously unused portion of page 507. As shown in FIG. 5B, content item 514 has not had an advertisement incorporated with it. In some embodiments, this means that one of the following may be true: content item 514 is not licensed content; content item 514 is licensed content but the payment method of the license does not include or permit advertisement incorporation; or content item 514 is licensed content that permits advertisement incorporation, but an appropriate advertisement was not selected to be associated with the content item or the content item was not recognized by the content licensing management system.

IV. System a. Licensing Server

Figure 6:
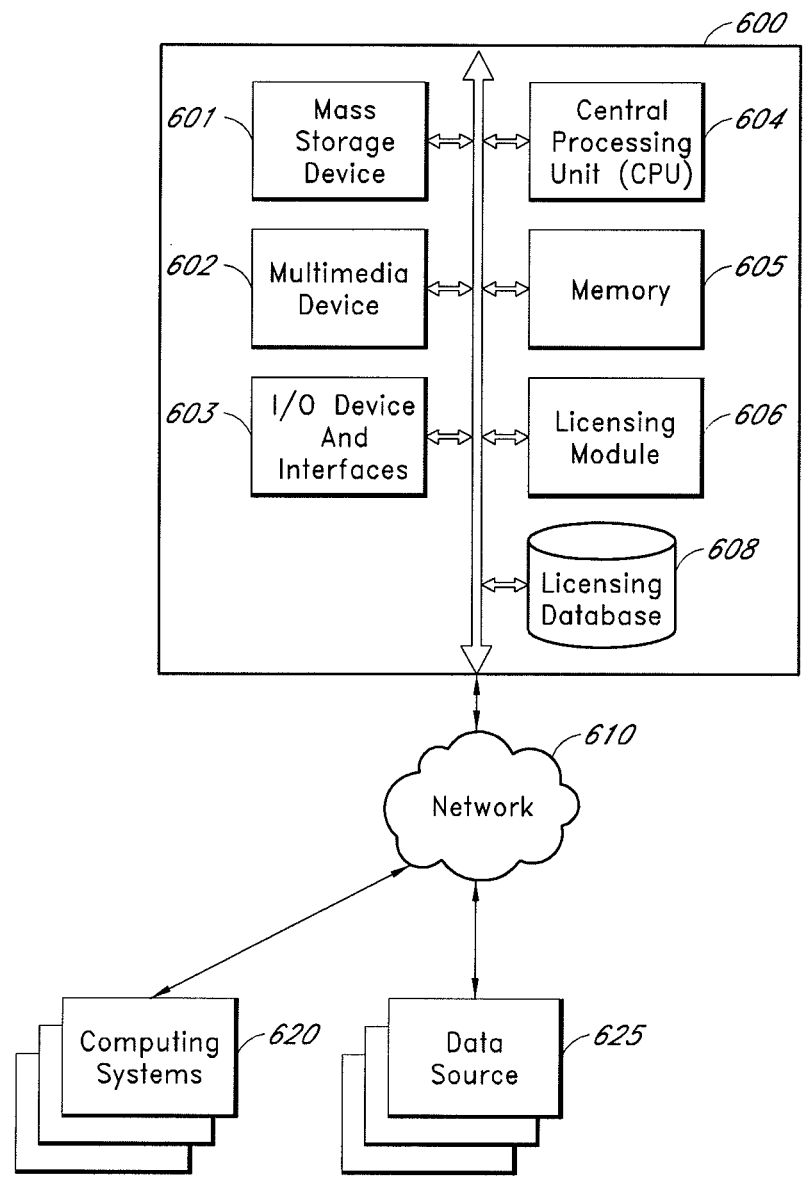
FIG. 6 is a high-level block diagram illustrating one embodiment of a system for electronically managing content licenses.

In some embodiments, the systems, computer clients and/or servers described above take the form of a licensing server 600 shown in FIG. 6, which is a block diagram of one embodiment of a computing system (which can be a fixed system or mobile device) that is in communication with one or more computing systems 620 and/or one or more data sources 625 via one or more networks 610. The licensing server 600 may be used to implement one or more of the systems and methods described herein. While FIG. 6 illustrates one embodiment of a licensing server 600, it is recognized that the functionality provided for in the components and modules of licensing server 600 may be combined into fewer components and modules or further separated into additional components and modules.

In one embodiment, the licensing server 600 also comprises a computer suitable for controlling and/or communicating with large databases and performing high volume processing. The licensing server 600 also comprises a central processing unit ("CPU") 604, which may comprise a conventional microprocessor. The licensing server 600 further comprises a memory 605, such as random access memory ("RAM") for temporary storage of information and/or a read only memory ("ROM") for permanent storage of information, and a mass storage device 601, such as a hard drive, diskette, or optical media storage device. Typically, the modules of the licensing server 600 are connected to the computer using a standards based bus system. In different embodiments, the standards based bus system could be Peripheral Component Interconnect (PCI), Microchannel, SCSI, Industrial Standard Architecture (ISA) and Extended ISA (EISA) architectures, for example.

The exemplary licensing server 600 comprises one or more commonly available input/output (I/O) devices and interfaces 603, such as a keyboard, mouse, touchpad, and printer. In one embodiment, the I/O devices and interfaces 603 comprise one or more display devices, such as a monitor, that allows the visual presentation of data to a user. More particularly, a display device provides for the presentation of GUIs, application software data, and multimedia presentations, for example. In the embodiment of FIG. 6, the I/O devices and interfaces 603 also provide a communications interface to various external devices. The licensing server 600 may also comprise one or more multimedia devices 602, such as speakers, video cards, graphics accelerators, and microphones, for example.

b. Components i. Module

In one embodiment, the processes, systems, and methods illustrated above may be embodied in part or in whole in software that is running on a computing device. The functionality provided for in the components and modules of the computing device may comprise one or more components and/or modules. For example, the computing device may comprise multiple central processing units (CPUs) and a mass storage device, such as may be implemented in an array of servers.

In general, the word "module," as used herein, refers to logic embodied in hardware or firmware, or to a collection of software instructions, possibly having entry and exit points, written in a programming language, such as, for example, Java, C or C++, or the like. A software module may be compiled and linked into an executable program, installed in a dynamic link library, or may be written in an interpreted programming language such as, for example, BASIC, Perl, Lua, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

ii. Computing Device

The licensing server 600 may run on a variety of computing devices, such as, for example, a server, a Windows server, a Structure Query Language server, a Unix server, a personal computer, a mainframe computer, a laptop computer, a cell phone, a personal digital assistant, a kiosk, an audio player, and so forth. The licensing server 600 is generally controlled and coordinated by operating system software, such as z/OS, Windows 95, Windows 98, Windows NT, Windows 2000, Windows XP, Windows Vista, Linux, BSD, SunOS, Solaris, or other compatible operating systems. In Macintosh systems, the operating system may be any available operating system, such as MAC OS X. In other embodiments, the licensing server 600 may be controlled by a proprietary operating system. Conventional operating systems control and schedule computer processes for execution, perform memory management, provide file system, networking, and I/O services, and provide a user interface, such as a graphical user interface ("GUI"), among other things.

iii. Network

In the embodiment of FIG. 6, the licensing server 600 is coupled to a network 610, such as a LAN, WAN, or the Internet, for example, via a wired, wireless, or combination of wired and wireless, communication link. The network 610 communicates with various computing devices and/or other electronic devices via wired or wireless communication links. In the exemplary embodiment of FIG. 6, the network 610 is communicating with one or more computing systems 620 and/or one or more data sources 625.

iv. Input/Output Devices and Interfaces

Access to the licensing module 606 of the licensing server 600 by computing systems 620 and/or by data sources 625 may be through a web-enabled user access point such as the computing systems' 620 or data source's 625 personal computer, cellular phone, laptop, or other device capable of connecting to the network 610. Such a device may have a browser module, implemented as a module that uses text, graphics, audio, video, and other media to present data and to allow interaction with data via the network 610.

The browser module or other output module may be implemented as a combination of an all points addressable display such as a cathode-ray tube (CRT), a liquid crystal display (LCD), a plasma display, or other types and/or combinations of displays. In addition, the browser module or other output module may be implemented to communicate with input devices 603 and may also comprise software with the appropriate interfaces which allow a user to access data through the use of stylized screen elements such as, for example, menus, windows, dialog boxes, toolbars, and controls (for example, radio buttons, check boxes, sliding scales, and so forth). Furthermore, the browser module or other output module may communicate with a set of input and output devices to receive signals from the user.

The input device(s) may comprise a keyboard, roller ball, pen and stylus, mouse, trackball, voice recognition system, or pre-designated switches or buttons. The output device(s) may comprise a speaker, a display screen, a printer, or a voice synthesizer. In addition a touch screen may act as a hybrid input/output device. In another embodiment, a user may interact with the system more directly such as through a system terminal connected to the score generator without communications over the Internet, a WAN, or LAN, or similar network.

v. Remote

In some embodiments, the licensing server 600 may comprise a physical or logical connection established between a remote microprocessor and a mainframe host computer for the express purpose of uploading, downloading, or viewing interactive data and databases on-line in real time. The remote microprocessor may be operated by an entity operating the licensing server 600, including the client server systems or the main server system, and/or may be operated by one or more of the data sources 625 and/or one or more of the computing systems. In some embodiments, terminal emulation software may be used on the microprocessor for participating in the micro-mainframe link.

In some embodiments, computing systems 620 that are internal to an entity operating the licensing server 600 may access the licensing module 606 internally as an application or process run by the CPU 604.

vi. Database

In some embodiments, the computing device(s) communicates with one or more databases that store information on content, licenses, advertisers, advertisements, pages, and/or publishers. This database or databases may be implemented using a relational database, such as SQLite, Sybase, Oracle, CodeBase, mySQL, and Microsoft® SQL Server as well as other types of databases such as, for example, a flat file database, an entity-relationship database, an object-oriented database, and/or a record-based database.

vii. Other Systems

In addition to the systems that are illustrated in FIG. 6, the network 610 may communicate with other data sources or other computing devices. The licensing server 600 may also comprise internal and/or external data sources not illustrated in FIG. 6.

In some embodiments, the acts, methods, and processes described herein are implemented within, or using, software modules (programs) that are executed by one or more general purpose computers. The software modules may be stored on or within any suitable computer-readable medium. It should be understood that the various steps may alternatively be implemented in-whole or in-part within specially designed hardware. The skilled artisan will recognize that not all calculations, analyses and/or optimization require the use of computers, though any of the above-described methods, calculations or analyses can be facilitated through the use of computers.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

V. Additional Embodiments

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Additionally, the skilled artisan will recognize that any of the above-described methods can be carried out using any appropriate apparatus. Further, the disclosure herein of any particular feature in connection with an embodiment can be used in all other disclosed embodiments set forth herein. Thus, it is intended that the scope of the present invention herein disclosed should not be limited by the particular disclosed embodiments described above.

What is claimed is:

1. A computer-implemented method of electronically associating an advertisement with an image, the computer-implemented method comprising:
    sending code to a client system, the code comprising instructions to automatically analyze content to identify a reference to one or more images within the content;
    as a result of the code sent to the client system being executed by the client system, receiving from the client system information associated with at least one of the content or the one or more images; and
    sending advertisement data to the client system including an advertisement to be displayed by at least partially covering a portion of the at least one of the one or more images during display of the content.

2. The computer-implemented method of claim 1, further comprising, for at least one of the one or more images, electronically selecting the advertisement to associate with the at least one of the one or more images based at least in part on at least one of the content or the one or more images.

3. The computer-implemented method of claim 1, wherein the content is a webpage.

4. The computer-implemented method of claim 1, wherein identifying a reference to the one or more images within the content includes identifying a reference to a first image and a reference to a second image, wherein advertisement data is selected for the first image, wherein advertisement data is not selected for the second image.

5. The computer-implemented method of claim 1, wherein the reference to one or more images comprises a Uniform Resource Locator included within the content.

6. The computer-implemented method of claim 1, wherein the received information associated with each of the one or more images located by the code comprises at least one of a dimension of the image, a file name of the image, a location of the image or metadata associated with the image.

7. The computer-implemented method of claim 1, wherein the code executed by the client system comprises JavaScript.

8. The computer-implemented method of claim 1, wherein the advertisement data comprises at least one of HyperText Markup Language data, a Flash object or text data.

9. A system for associating an advertisement with an image, the system comprising:
   a computing device, comprising one or more electronic processors, that is configured to:
      analyze content of electronic data to locate one or more images referenced in the electronic data;
      send an electronic request for an advertisement to display in association with the one or more images, wherein the request includes information associated with the one or more located images and information associated with the content;
      electronically receive, in response to the request, at least one advertisement and an indication of at least one of the one or more images with which to associate the at least one advertisement; and
      automatically present the advertisement for display, such that the advertisement is placed over at least a portion of the indicated at least one of the one or more images.

10. The system of claim 9, wherein the electronic data comprises a webpage.

11. The system of claim 9, wherein the information associated with the one or more located images includes a network location of an image file.

12. The system of claim 9, wherein advertisement data is received for a first image of the at least one of the one or more located images, wherein advertisement data is not received for a second image of the at least one of the one or more located images.

13. The system of claim 9, wherein the received at least one advertisement presented for display comprises at least one of text, an image, an animation, interactive content or a video.

14. The system of claim 9, wherein the received at least one advertisement presented for display comprises a Flash object.

15. The system of claim 9, wherein the computing device is further configured to present a user interface element configured to cause the advertisement to be removed from the at least one of the one or more images when the user interface element is selected by a user.

16. The system of claim 9, wherein the computing device is further configured to, prior to sending the request for the advertisement, analyze webpage metadata where at least one of the one or more images is referenced in order to determine whether to request an advertisement to display in association with the at least one of the one or more images.

17. The system of claim 9, wherein the computing device is further configured to, prior to sending the request for the advertisement, analyze metadata associated with the one or more located images in order to determine whether to request an advertisement to display in association with the at least one of the one or more images.

18. The system of claim 9, wherein the computing device is further configured to receive an indication of a user selection of the advertisement, wherein the received indication of the user selection causes the computing device to request content associated with the advertisement.

19. The system of claim 9, wherein the computing device comprises a phone.

20. A non-transitory computer-readable medium having a computer-executable component, the computer-executable component comprising:
   a content analysis component for:
      analyzing content of electronic data to locate one or more images referenced in the electronic data;
      sending an electronic request for an advertisement to display in association with the one or more images, wherein the request includes information associated with the one or more located images and information associated with the content;
      electronically receiving advertisement data including at least one advertisement; and
      presenting the at least one advertisement for display, such that the at least one advertisement is placed over at least a portion of at least one of the one or more images.

21. The non-transitory computer-readable medium of claim 20, wherein the electronic data comprises a page, wherein the content analysis component is further for analyzing page metadata where at least one of the one or more images is referenced in the page.

22. The non-transitory computer-readable medium of claim 20, wherein the located one or more images comprise one or more images that are referenced within the electronic data by a Uniform Resource Locator or a file name.

23. A system for associating an advertisement with an image, the system comprising:
   a computing device, comprising one or more electronic processors, that is configured to:
      electronically transmit code, to a client system, comprising instructions to analyze electronic content to identify a reference to one or more images within the content;
      as a result of the code being executed by the client system, receive from the client system information associated with at least one of the content or the one or more images; and
      electronically transmit advertisement data to the client system including an advertisement to be displayed by at least partially covering a portion of the at least one of the one or more images during display of the content.

24. The system of claim 23, wherein the computing device is further configured to, for at least one of the one or more images, electronically select the advertisement to associate with the at least one of the one or more images based at least in part on at least one of a dimension of the image, a file name of the image or a location of the image.

25. The system of claim 23, wherein the code transmitted to the client system comprises instructions for displaying the advertisement by at least partially covering the portion of the at least one of the one or more images.

* * * * *